Figure 1:
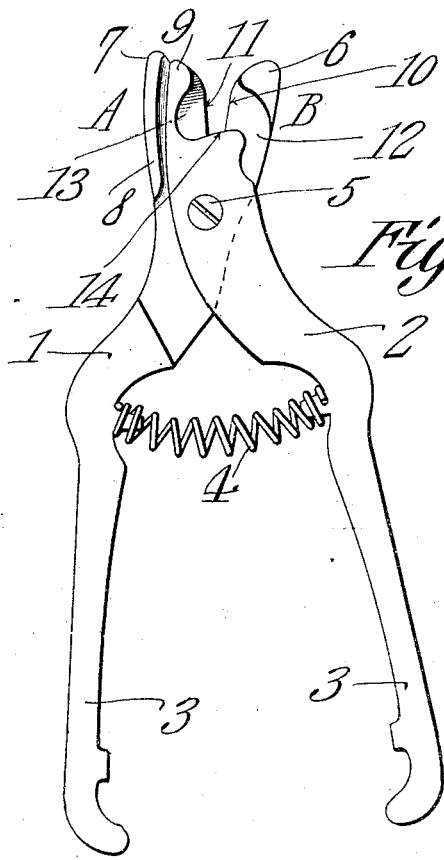

J. B. TUTTLE.
FRUIT AND FLOWER CLIPPER.
APPLICATION FILED SEPT. 27, 1909.

972,417.

Patented Oct. 11, 1910.

Inventor
Jonathan B. Tuttle.

Witnesses

By C. A. Snow & Co.
Attorneys

UNITED STATES PATENT OFFICE.

JONATHAN B. TUTTLE, OF CLAREMONT, CALIFORNIA.

FRUIT AND FLOWER CLIPPER.

972,417.      Specification of Letters Patent.      Patented Oct. 11, 1910.

Application filed September 27, 1909. Serial No. 519,823.

*To all whom it may concern:*

Be it known that I, JONATHAN B. TUTTLE, a citizen of the United States, residing at Claremont, in the county of Los Angeles and State of California, have invented a new and useful Fruit and Flower Clipper, of which the following is a specification.

This invention has reference to improvements in fruit and flower clippers and is designed especially for use in clipping citrus fruits from the stem preparatory for packing the same for shipment.

The improved clipper while useful in connection with different citrus fruits is particularly useful for clipping oranges from their stems and for convenience of description oranges only will be referred to hereinafter with the understanding, however, that the clipper may be used for other fruits and for the clipping of flowers.

It is customary to remove oranges from the trees, wrap them individually in paper and pack them tightly in boxes for transportation. Experience has shown that one of the chief causes of decay in oranges after being picked from the tree is injury to the outer layer of cells of the skin or rind of the orange. Even slight abrasions, cuts or other like injuries cause the rapid decay of the fruit, and these injuries may be caused by an instrument employed in severing the oranges from their stems, or may be caused by the stem portions still adherent to the oranges being sufficiently long to puncture the skin of adjacent oranges when the latter are packed for shipment.

A common form of clipper for severing the oranges from their stems is one quite similar to the common pruning shears, except that the blades are usually slightly curved in the direction of their length. It has been found in practice that there is a tendency to cut the stems in such manner that the portion remaining on the orange projects to such an extent as to endanger adjacent oranges when the oranges are packed for shipment, or in the attempt to cut the stems very short some portion of the external cellular tissue of the skin of the orange is sliced off by the cutting blade so that the injury to the orange skin causes quick decay of the orange and since the blades are so arranged as to sever the stem by a shear cut the blades are necessarily quite long and the extent of movement of the hand of the operator causes fatigue, so that the operator will hold the blades partially closed when brought into operative relation to an orange stem, thus increasing the leverage at the blade ends and thereby necessitating the application of greater power to sever the stem. Furthermore there is a liability of cutting the stem at an angle instead of straight across thus leaving a sharp point which will easily pierce the skin of adjacent oranges when the oranges are packed for shipment. Many oranges have a slight pit or depression at the junction of the stem with the fruit, and it has been proposed to form the cutting blade sufficiently spherical to enter the depression, the movable shearing blade being on the inner surface of the other blade so that the fruit is protected from contact with the moving blade. Such a cutter does not readily avoid angular cuts or the leaving of long plugs on the oranges.

With the structure of the present invention, the clipper jaws are guided to the most advantageous cutting point so that little effort on the part of the operator is necessary to cause the severing of the stem while the cutting blades are made to abut instead of passing one by the other for each shear cut, this allowing the blades to be brought into the closest relation to the orange, while the blades are shaped along the active portions to enter the depression at the stem end of the orange so that the shortest possible plug remains on the orange after being severed from the tree. The main portion of the movable blade is within the confines of the fixed blade which extends to both sides of the movable blade thus preventing any material rocking of the cutter on the orange and any deviation from a true lateral cut is so small as to be immaterial, especially as the plug is cut so short that its free end cannot come into engagement with another orange when the oranges are packed for shipment.

The invention will be best understood from a consideration of the following detail description taken in connection with the accompanying drawings forming a part of this specification, in which drawings,

Figure 2:
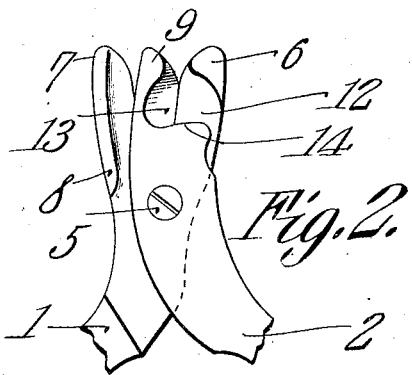
Figure 3:
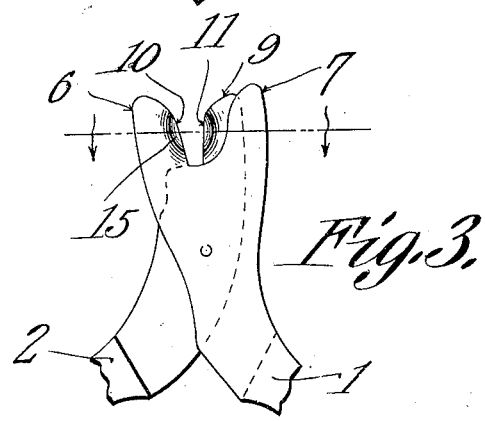
Figure 4:
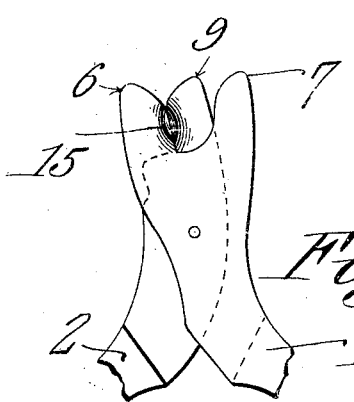
Figure 5:
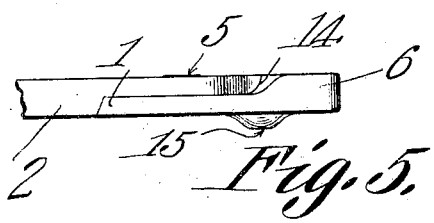
Figure 6:
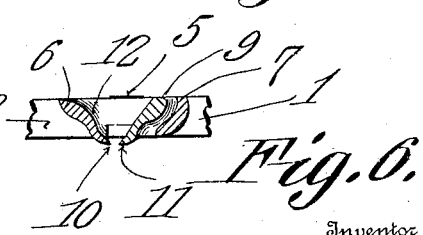

Figure 1 is a plan view of a fruit clipper made in accordance with the present invention, the jaws being shown in the open position. Fig. 2 is a similar view of the cutting end of the tool with the jaws in the closed position. Fig. 3 is a view of the under side of the cutting end of the clipper with the jaws extended. Fig. 4 is a view similar to Fig. 3 with the jaws closed. Fig. 5 is a side or edge view of the cutting end of the tool. Fig. 6 is a section on the line A—B of Fig. 1.

Referring to the drawings, the clipper is shown as formed of two members 1—2 having handle ends 3 and an interposed spring 4, which handle ends and spring may be such as are commonly used in clippers and pruning shears, the construction of these parts being immaterial to the present invention. The two members 1 and 2 are pivoted together by a suitable pivot stud or screw 5. The end of the member 1 remote from its handle portion 3 is bifurcated, one side being formed into a blade 6 and the other side into a finger 7 having a ledge or flange 8 along the edge remote from the blade 6. The member 2 is formed on the side of the pivot remote from its handle 3 into a cutting blade 9 and the member 2 over-rides the corresponding portion of the member 1 adjacent to the pivot 5 while the blade 9 is, with the exception of its cutting portion, normally within the confines of the flange 8 and the inner edge of the finger 7. That face of the member 1 remote from that engaged by the member 2 is designed to rest upon or be closely adjacent to the orange when the stem is being severed and this face of the member 1 may be slightly rounded with all edges also rounded to present no sharp corners which would be liable to injure the fruit. The outer ends of the blade 6 and finger 7 are curved away one from the other and have their edges rounded to guide the clipper onto the stem of the orange, but these parts present no sharp edges liable to injure the skin of the fruit.

The cutting edge of the blade 6, which edge is shown at 10 is approximately or quite straight for a distance and the cutting edge of the blade 9, which edge is shown at 11 is shaped to match the edge 10, and when the blades are moved toward the active position, the edges 10 and 11 are brought into abutment, the cutting of the stem being brought about by an abutting action of the cutting edges and not by a shearing action. The blades 6 and 9 adjacent to the cutting edges 10 and 11 are shaped to project beyond the face of the member 1 remote from that engaged by the member 2 and together they form an approximately spherical or spheroidal projection of comparatively small extent beyond the general plane of the orange engaging face of the instrument. These projecting portions of the blades 6 and 9, which portions terminate in the cutting edges 10 and 11, are designated by the reference numerals 12 and 13 respectively.

When the clipper is in the normal open position all the portion of the blade 9 except that portion of the projecting part 13 immediately adjacent to the cutting edge 11 is above the outer face of the finger 7 so that the only portion of the blade 9 which may engage the orange is of very limited area not exceeding the usual extent of the plug of the orange to one side of the stem and the area of the extended portion of the blade 6 immediately adjacent to the cutting edge 10 is of quite limited area so that those portions of the instrument which after the instrument is applied to the stem of the orange have a movement relative to the orange are so small that they do not at any time come in such contact with the skin of the orange as to cause injury to the same.

The blade 9 where it joins the member 2 is formed into a shoulder 14 at some little distance away from the cutting edge 11 but quite close to the pivot 5. This shoulder forms an abutment for the stem of the orange stopping the clipper when the cutting edges 10 and 11 are in the most effective relation to the stem, but at the same time in no wise cramping the stem and permitting the instrument to be brought into close relation to the orange.

Because of the approximately spherical form of the projecting members of the blades terminating in the cutting edges and the small area of these projecting members considerable latitude of the movement of the clippers with relation to the orange is permissible while still causing a cut of the stem closely adjacent to the plug of the orange so that long plugs and angular cuts are practically avoided without effort on the part of the operator while the likelihood of injury to the skin of the orange is completely obviated.

While not mandatory, the portions of the blades immediately adjacent to the cutting edges may be flattened on the orange side as indicated at 15 so that the cuts produced may be straight across the stem instead of slightly curved should this portion of the cutting edges of the blades conform strictly to the spherical or spheroidal shape of the extensions 12 and 13 of the two blades.

What is claimed is:

1. A fruit clipping instrument having two relatively movable members pivoted together in coactive relation, one of the members having a substantially plane fruit engaging face with a cutting jaw projecting beyond said face in a direction perpendicular thereto, and the other member having a matching cutting jaw projecting in like manner and to a like extent beyond the fruit engaging face of the first named member.

2. A fruit clipping instrument having two relatively movable members pivoted together in coactive relation, one of the members having a substantially plane fruit engaging face with a cutting jaw projecting beyond said face in a direction perpendicular thereto, and the other member having a matching cutting jaw projecting in like manner and to a like extent beyond the fruit engaging face of the first named member, the cutting jaws being rounded in both the direction of the length of the instrument and transversely thereto.

3. A fruit clipping instrument having relatively movable members pivoted together in coactive relation, one of the members having separated terminal portions and a substantially plane fruit engaging face and one of said portions having formed thereon at the edge toward the other portion a cutting jaw projecting beyond the fruit engaging face and perpendicular thereto, and the other member having a matching cutting jaw projecting in like manner and to a like extent beyond the fruit engaging face of the first named member through the space between the two portions thereof.

4. A fruit clipper provided with a substantially plane fruit-engaging face and having relatively movable coacting cutting members projecting beyond the fruit-engaging face of the clipper at a point intermediate of the width and length thereof and in a direction substantially perpendicular to said face.

5. A fruit clipper provided with a substantially plane fruit-engaging face and having meeting cutters movable actively into abutting relation and projecting beyond the plane of the fruit-engaging face in a direction substantially perpendicular thereto, the cutters being together of less extent than the fruit-engaging face.

6. A fruit clipper having a substantially plane fruit-engaging face and provided with jaws with matching cutters in abutting relation projecting to one side of the fruit-engaging face, one jaw being movable within the confines of the other jaw.

7. A fruit clipper having two jaws pivoted together, one jaw being bifurcated and formed with a substantially plane fruit-engaging face and having a cutting edge projecting beyond such face in a direction substantially perpendicular thereto, and the other jaw having a cutting edge projecting through and movable between the two parts of the first named jaw, the cutting edge of one jaw being in operative relation with that of the other.

8. A fruit clipper having two jaws pivoted together, one jaw having its body portion confined within the other, and each jaw being provided with a side cutter matching the cutter of the other jaw and both cutters projecting beyond the same face of the clipper in a direction substantially perpendicular thereto.

9. A fruit clipper having two jaws pivoted together, one jaw being provided with a plane fruit engaging face and with a shoulder determining the extent of movement of the part to be clipped into the space between the jaws, each jaw being provided with a rounded side extension projecting beyond the fruit-engaging face in a direction substantially perpendicular thereto and terminating in a cutting edge in abutting relation to the cutting edge of the other jaw.

In testimony that I claim the foregoing as my own, I have hereto affixed my signature in the presence of two witnesses.

JONATHAN B. TUTTLE.

Witnesses:
E. HUME TALBERT,
F. T. CHAPMAN.